United States Patent
Bosak

(10) Patent No.: US 9,083,718 B1
(45) Date of Patent: Jul. 14, 2015

(54) GLOBAL GRID PROTOCAL, A SYSTEM AND METHOD FOR ESTABLISHING AND SIMPLIFYING PEER-TO-PEER NETWORKING CONNECTIONS AMONG A PLURALITY OF COMPUTERS AND DIVICES BY DYNAMICALLY GENERATING IDENTIFIERS AND PERFORMING ROUTING AND TRAVERSAL PROCESSES

(76) Inventor: Brian Bosak, Brooklyn Park, MN (US)

( * ) Notice: Subject to any disclaimer, the term of this patent is extended or adjusted under 35 U.S.C. 154(b) by 621 days.

(21) Appl. No.: 13/506,051

(22) Filed: Mar. 24, 2012

Related U.S. Application Data

(60) Provisional application No. 61/516,024, filed on Mar. 28, 2011.

(51) Int. Cl.
*G06F 15/16* (2006.01)
*H04L 29/08* (2006.01)

(52) U.S. Cl.
CPC .......... *H04L 67/104* (2013.01); *H04L 67/1046* (2013.01)

(58) Field of Classification Search
CPC ... H04L 67/104; H04L 29/06; H04L 67/1046; H04L 67/1068; H04L 67/04
USPC .................................................. 709/223, 228
See application file for complete search history.

(56) References Cited

U.S. PATENT DOCUMENTS

| | | | |
|---|---|---|---|
| 2003/0041141 A1* | 2/2003 | Abdelaziz et al. | 709/223 |
| 2006/0088039 A1* | 4/2006 | Kakivaya et al. | 370/400 |
| 2006/0215684 A1* | 9/2006 | Capone | 370/437 |
| 2007/0233879 A1* | 10/2007 | Woods et al. | 709/227 |
| 2012/0246301 A1* | 9/2012 | Vyrros et al. | 709/224 |

OTHER PUBLICATIONS

Fitzgerald, "Serializing Java Objects with Xstream" Aug. 18, 2004, XML.com p. 1-5.*
Wong et al. "Xstream: A middlleware for streaming XML contents over wireless environments", Dec. 2004, IEEE, vol. 30, No. 12.*

* cited by examiner

*Primary Examiner* — Brian J Gillis
*Assistant Examiner* — Shean Tokuta

(57) ABSTRACT

A system and method of establishing and simplifying peer-to-peer networking connections among a plurality of computers and devices, whereby network connections may be established whether firewalls, network address translators, or any combination thereof, are present or not. The method includes: each peer dynamically generating globally unique identifiers and sending, receiving and adding to lists of known mesh configurations sent to and received from other peers or loaded from a storage device; and asynchronously attempting a specified sequence of methods to establish connectivity to the closest peer, including a sequence of methods of traversing any network address translators or firewalls that may be present.

1 Claim, 3 Drawing Sheets

`US 9,083,718 B1`

GLOBAL GRID PROTOCAL, A SYSTEM AND METHOD FOR ESTABLISHING AND SIMPLIFYING PEER-TO-PEER NETWORKING CONNECTIONS AMONG A PLURALITY OF COMPUTERS AND DIVICES BY DYNAMICALLY GENERATING IDENTIFIERS AND PERFORMING ROUTING AND TRAVERSAL PROCESSES

CROSS-REFERENCE TO RELATED APPLICATIONS

This application claims the benefit of provisional patent application No. 61/516,024, filed Mar. 28, 2011 by the present inventor, which is incorporated by reference.

COPYRIGHT NOTICE

A portion of the disclosure of this patent document contains material which is, subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FEDERALLY SPONSORED RESEARCH

Not Applicable.

SEQUENCE LISTING OR PROGRAM

The application contains a computer program listing appendix, in ASCII format, submitted on compact disc. The total number of compact discs including duplicates is two (2), the first one being labeled "Global Grid Protocol Copy 1" and the second one being labeled "Global Grid Copy 2." The two compact discs (Copy 1 and Copy 2) are identical. For both discs, the machine format is: IBM-PC; operating system compatibility is: Microsoft Windows. Each compact disc contains seven (7) files. The names, dates of creation and sizes of these seven files are: Main.cs (8,920 bytes), created Jul. 28, 2011; UDPServer.cs (6,639 bytes), created Sep. 13, 2011; RoutedSocket.cs (941 bytes), created Aug. 27, 2011; UDPSocket.cs (9,774 bytes), created Jul. 28, 2011; VSocket.cs (3,649 bytes), created Jul. 28, 2011; UPNP.cs (10,036 bytes), created Mar. 17, 2012; and XStream.cs (24,314 bytes), created Aug. 27, 2011. The files were copied to the compact discs on Mar. 17, 2012.

The described files on the compact discs are a part of this Application and are incorporated herein by reference.

The material on the compact discs that is made a part of this Application is copyright 2010-2012 by Brian Bosak. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Prior Art

This application relates to systems and methods for establishing and simplifying peer-to-peer networking connections. In many computer network applications, such as peer-to-peer networking, it is desirable for two or more clients to establish connections with each other without requiring all information to pass through a centralized server. To connect to another network node a client generally sends a message to a recipient node requesting a connection. However, if the intended recipient node is behind a firewall or network address translation (NAT) device, this request may be blocked. This is because an NAT device may be configured to only allow messages to reach a recipient when the message is in response to a communication initiated by the recipient. Unsolicited communications are generally dropped. Alternatively, an NAT device may map a given internal IP address and port to a different external address and/or port, making it similarly difficult to reach a given node.

When two nodes are each behind different NAT devices, neither node is able to initiate the connection to the other node because the incoming connection requests are blocked by the NAT device on the receiving end. As a result, the nodes are unable to communicate with each other. This is a challenging problem in applications such as peer-to-peer networking that utilize direct communication between two devices on a network.

Firewalls are systems designed to prevent unauthorized access to or from a private network, particularly to prevent unauthorized Internet users from accessing private networks connected to the Internet, especially intranets. When a message enters or leaves an intranet through a firewall, each message is examined and those that do not meet specified security criteria are blocked. Firewalls operate in various ways. Some operate as proxy servers, intercepting all messages and effectively hiding their true network addresses. This creates obvious problems for the establishment of peer-to-peer connections.

Network address translators (NAT's) have been employed to provide a means of conserving a dwindling supply of Internet Protocol (IP) addresses. Every node of an IP network, such as a computer, a router, network printer, is assigned an IP address that is used to locate and identify the node in communications with other nodes on the network. IPv4 provides $2^{32}$ addresses. While this initially appeared to be a sufficient number, it has proven not to be. Part of the problem is that large blocks of IPv4 addresses have been reserved for special uses and are unavailable for public allocation. Meanwhile, several other developments have converged to significantly increase the demand on the limited supply of addresses well beyond initial expectations. These include such things as the proliferation of mobile devices; the advent of always-on broadband Internet connections; the worldwide proliferation and growth of Internet connection users; the inefficient initial allocation of address use; organizational use of public IP addresses for devices accessible only within local networks; advances in hardware performance and processor features of server systems and sophisticated hardware abstraction layers making it possible to host many instantiations of an operating system on a single computer, each requiring a public IP address; and the need of websites for unique IP addresses for secure e-commerce transactions. In short, the IPv4 addressing structure provides an insufficient number of publicly routable addresses to provide a distinct address to every instance of an Internet device, service or interface.

Network address translation (NAT) operates to conserve IP addresses by permitting Internet Service Providers and enterprises to masquerade private network address space with only one publicly routable IPv4 address on the Internet interface of a router (called an NAT router), instead of allocating public addresses to each network device.

The problem of IP address depletion has been obviated to some extent by the recent deployment of IPv6, which is significantly more robust than IPv4, offering more than a quintillion unique IP addresses. IPv6 does not provide a complete solution to the problem, however, because completely effective deployment would require either replacement or significant reconfiguration of existing IPv4 devices. Complicating matters, IPv6-unaware NAT's break native and 6-to-4 IPv6 connectivity, and many break 6-in-4 tunnels. Inter-operability issues have also arisen as a result of the development of new network technologies and devices that do not use the Internet Protocol and/or devices that use a different addressing protocol, such as Bluetooth.

Advantages

The object of the invention is to enable users of computers and devices to more efficiently establish and simplify peer-to-peer networking connections, even when a computer or device is behind a network address translator (NAT) or firewall. While certain methods of traversing an NAT or firewall have been developed and used in other applications, the Global Grid Protocol is able to dynamically configure the use of such methods, thereby improving the speed and efficiency of the NAT or firewall traversal process and of establishing peer-to-peer networking connectivity in general.

Because the Global Grid Protocol uses dynamically-generated mesh-identifiers, it eliminates the need to use IP addresses to establish peer-to-peer connections, thereby providing solutions to the IPv4 address depletion problem; IPv6 deployment problems; IPv4-IPv6 interoperability problems; and problems involving the interoperability of IP devices and non-IP devices.

By dynamically generating globally-unique identifiers, the Global Grid Protocol also increases security, as compared with systems that assign and/or re-use static addresses, or systems in which identifiers are generated at the server or network end rather than the client/host, and are more susceptible to "spoofing."

A significant advantage of the Global Grid Protocol method of dynamic configuration of server/routing processes is the increased speed at which connections are established during periods of heavy use of network resources.

Another advantage of one or more aspects of the Global Grid Protocol is that it makes it simpler and easier for users, computers and devices to establish network connections with each other even in the presence of NAT's and firewalls.

These and other advantages of one or more aspects will become apparent from a consideration of the ensuing description and accompanying drawing.

SUMMARY

In accordance with one embodiment, the Global Grid Protocol is a system and method for establishing and simplifying peer-to-peer networking connections among a plurality of computers and devices by dynamically generating globally unique mesh identifiers and asynchronously initiating a three-step process that operates to establish a network connection whether network address translators, firewalls, or any combination thereof, are present or not.

DRAWINGS

Figures

DRAWINGS

Reference Numerals

Figure 1:
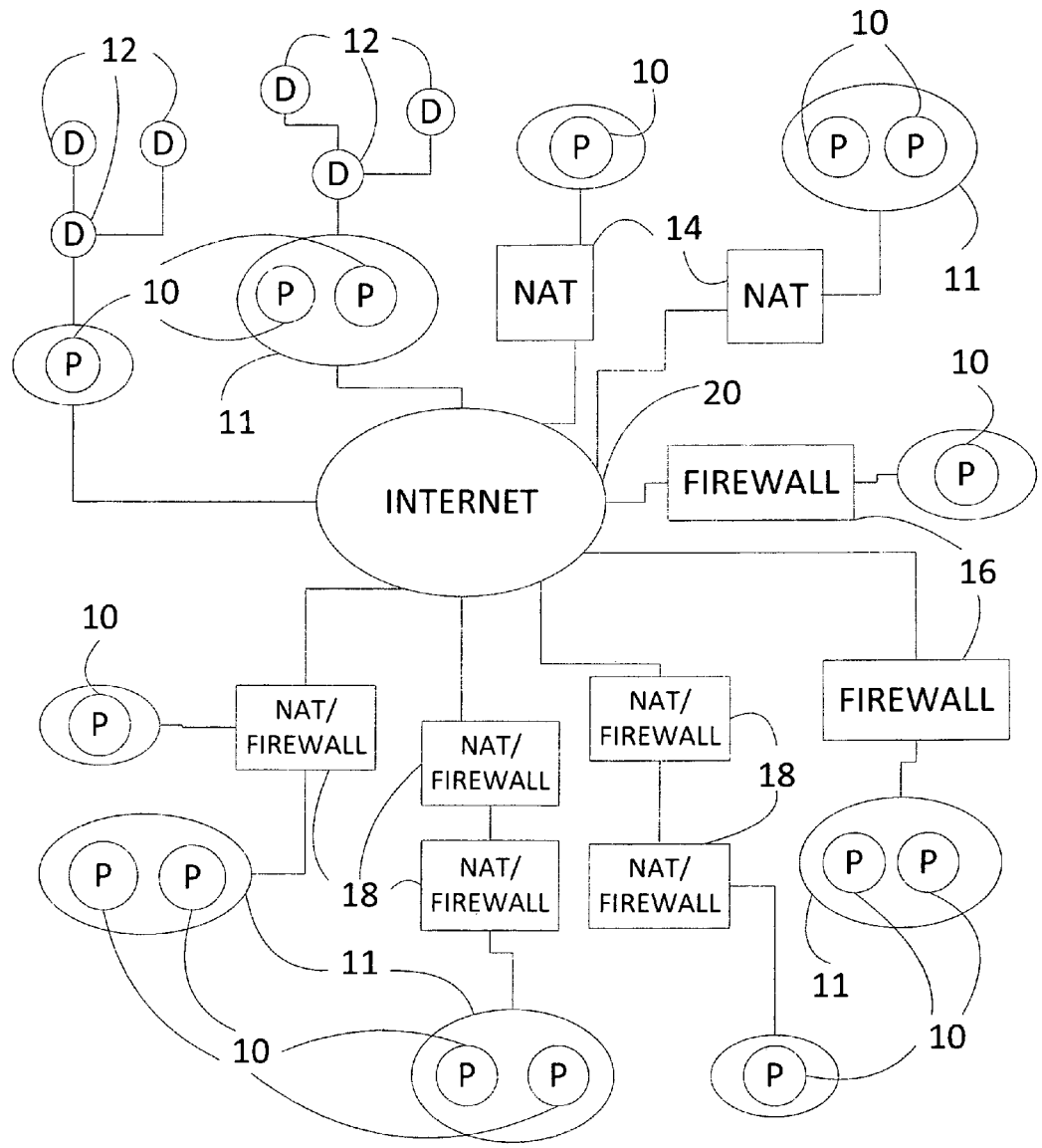
FIG. 1 illustrates a schematic representation of a peer-to-peer network having a plurality of peers and devices between which network connections are established using an embodiment of the present invention.

The reference numerals used in the drawings consist of:
10 Peer
11 Subnet
12 Non-Internet device (i.e., a device capable of connecting to a network other than the Internet)
14 Network Address Translator (NAT)
16 Firewall
18 Network Address Translator (NAT), firewall or both
20 The Internet
22 Mesh
24 Global Grid
110 Create XStream object
120 Determine whether routing information is valid and in the correct format
130 Throw an exception and quit
140 Try to send a "handshake" signal and wait for a response
150 Initiate server/routing processes
151 Attempt UPnP NAT traversal
152 Attempt port hole punching
153 Attempt route via known host (router)
160 Asynchronously search for peers, and raise an event when new peers are found
165 Peer found
170 OnClientConnect event
175 Mesh ADVERTISE received
180 Retrieve list of known mesh configurations from remote host and add
them to the local host's list
185 Mesh DISCOVER received
190 Send a list of mesh identifiers to the client and connected routing information.

DETAILED DESCRIPTION

Figure 2:
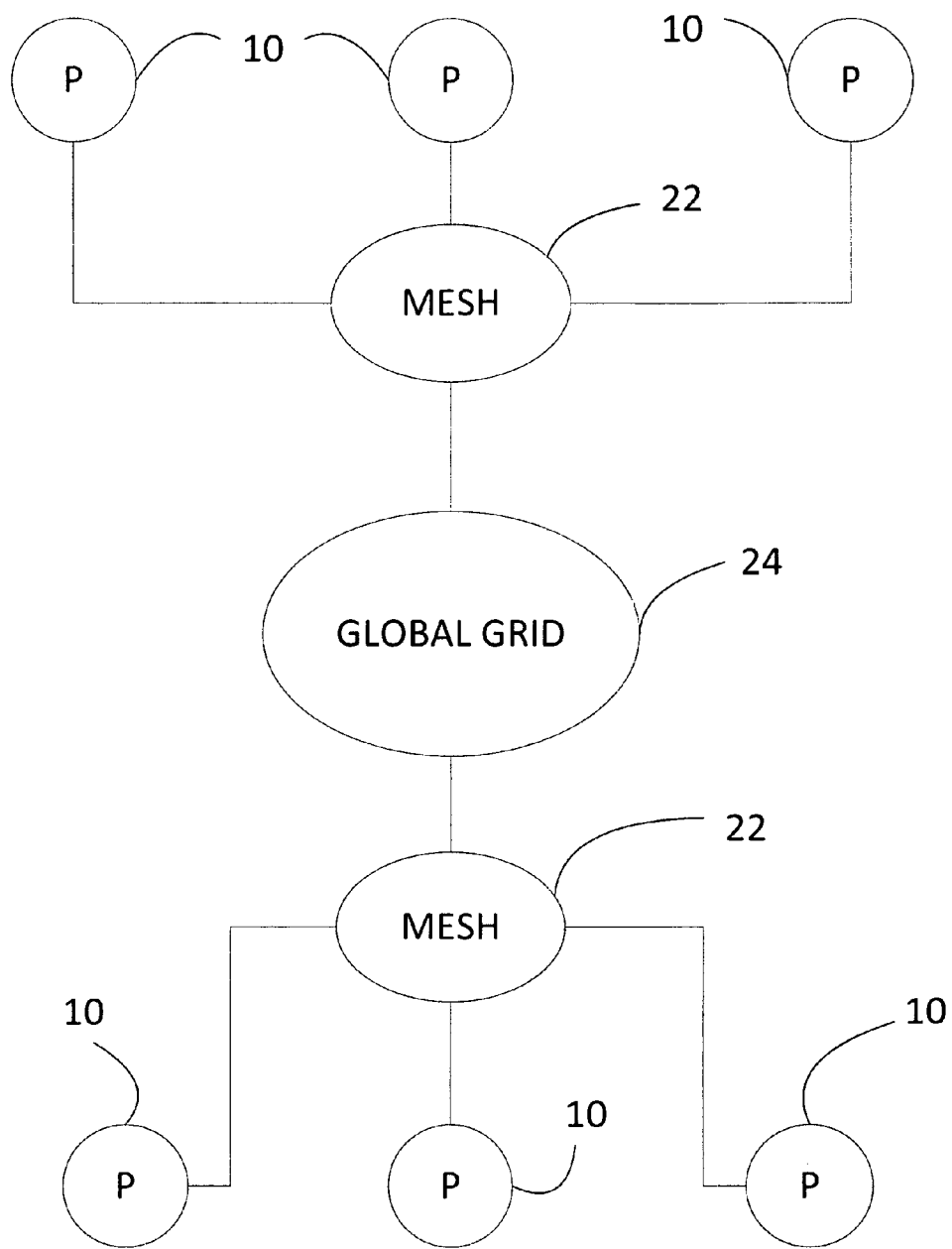
FIG. 2 illustrates a schematic representation of the network topology according to an embodiment of the present invention.
Figure 3:
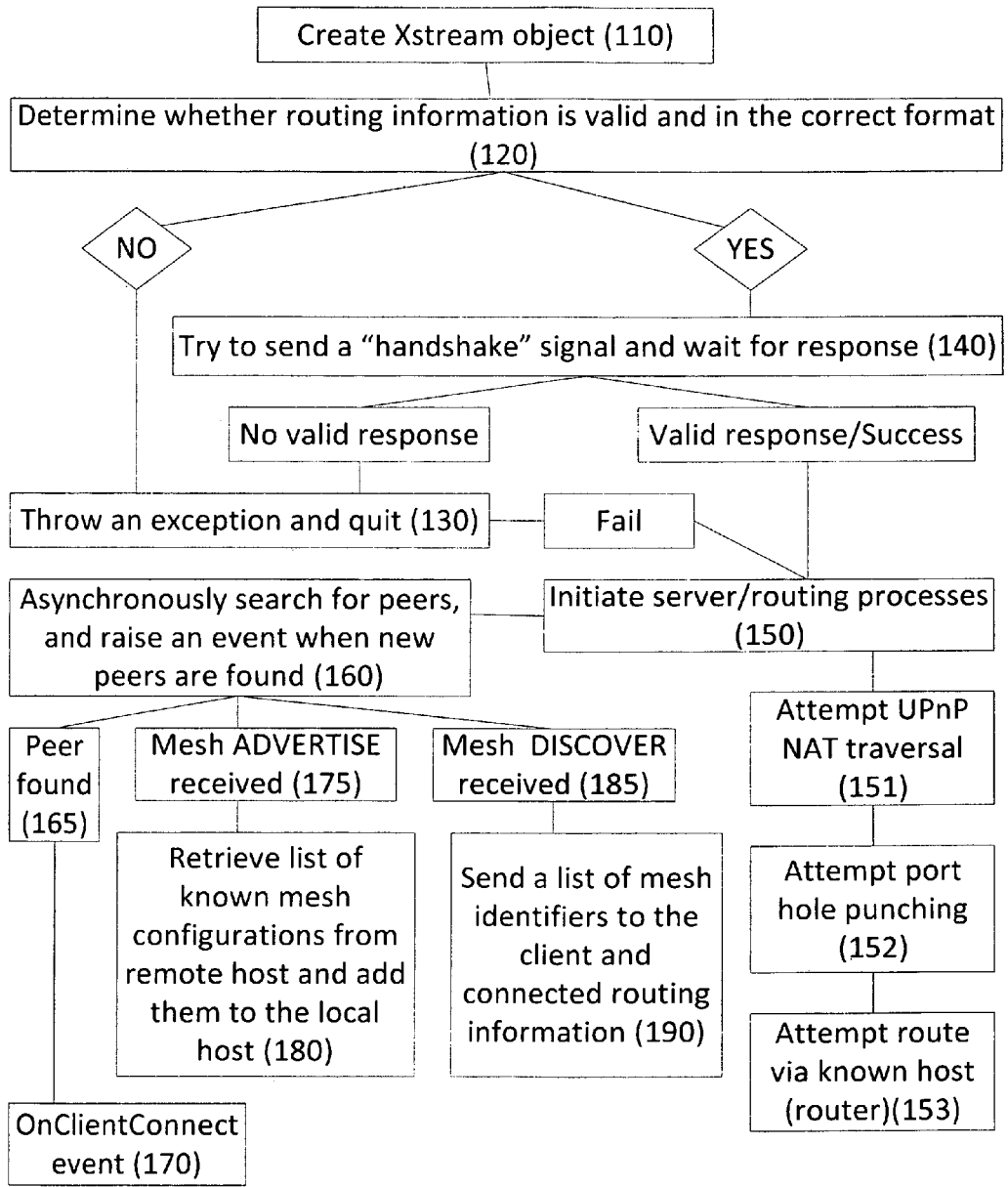
FIG. 3 is a flow chart representing a process of establishing communication among peers and devices with networking capability according to an embodiment of the present invention.

First Embodiment—FIGS. 1, 2 and 3

The Global Grid Protocol is implemented by expressing it as an algorithm written in programming code that can be installed as a software program onto, and read by, two or more computers or other processors that are either equipped with the necessary hardware to establish a network connection (for example, a network adapter or network interface card (NIC)), or are connected to such hardware in a way that makes it possible to establish a connection to a network consisting of at least two such computers or devices.

One embodiment of the invention is set out in a computer program source code listing that is submitted with this application on compact discs, in ASCII format. This embodiment is written in the computer programming language C# and operates on a PC with an Intel, AMD or ARM (Acorn RISC Machine, or Advanced RISC Machine) processor, using a computer operating system that supports .net, Mono or similar implementation of C# and the Base Class libraries, which is either equipped with a network adapter or network interface card (NIC) or connected to such hardware in a way that makes it possible to establish a connection to a network. Other embodiments, however, could use different programming languages, including but not limited to C, C++, Java or any other programming language. Additionally, other embodiments could use frameworks other than .net, Mono or an implementation of C# and the Base Class libraries. Other embodiments could use a different processor. Other embodiments could work on any other kind of computer or device that has network connection capability. Other embodiments could include a combination of one or more elements of any of the above-described embodiments. At present, I believe the embodiment I have set forth here operates most efficiently, but other embodiments are also satisfactory.

The present embodiment of the Global Grid Protocol is included in the program listing and it is also illustrated in FIGS. 1, 2 and 3.

The Global Grid Network Environment—FIG. 1

FIG. 1 illustrates a peer-to-peer network having a plurality of peers 10 and devices 12 between which network connections are established. The nodes in the network are connected using virtual or logical links, each of which corresponds to a path, typically through physical links. The network consists of peers 10; subnets (sub-networks) 11, each containing one or more peers 10; the Internet 20; and non-Internet devices, such as Bluetooth, IrDA and ad hoc Wi-Fi devices 12.

As FIG. 1 illustrates, some peers 10 and subnets 11 with connections to the Internet may be part of the global address space and use public IP addresses inasmuch as there are no NAT's (Network Address Translators) 14 between them and the Internet, but other peers 10 and subnets 11 may use private IP addresses since one or more NAT's 14 are located between the peer 10 and the Internet 20, or between the subnet 11 and the Internet 20. An NAT 14 may be located between a single peer 10 or subnet 11, but typically is located between a plurality of peers 10, a plurality of subnets 11, or a plurality of peers 10 and subnets 11.

A firewall 16 is a device or set of devices designed to permit or deny network transmissions based upon a set of rules. It is most commonly used to prevent unauthorized access to a peer 10 or subnet 11 in a network while permitting authorized communications to pass. Some firewalls 16 have network address translation functionality; others do not. That is to say, some firewalls 16 are also NAT's 14, but some are not.

In FIG. 1, the term "NAT/Firewall" 18 is used to designate a device that is either a network address translator (NAT), a firewall, or a combination of both an NAT and a firewall. As FIG. 1 illustrates, there may be an NAT/Firewall 18 between a peer 10 and the Internet 20; and there may be an NAT/Firewall 18 between a subnet 11 and the Internet 20. Peers 10 may share a single NAT/Firewall 18, and subnets 11 may also share a single NAT/Firewall 18. In addition, there may be more than one NAT/Firewall 18 between a peer 10 and the Internet 20, or between a subnet 11 and the Internet 20. A plurality of NAT/Firewalls 18 may be between a plurality of peers 10 and subnets 11.

Establishing connections between peers in a network through network address translators is commonly referred to as NAT traversal. Universal Plug and Play (UPnP) and port hole punching are known NAT traversal protocols.

The Global Grid Protocol is a method of establishing network connections among peers 10 and devices 12 whether network address translators 14, firewalls 16, or any combination of them 18 are present or not, and regardless of subnet 11. As such, the Global Grid Protocol enables both Internet and non-Internet network connections among peers 10 and devices 12.

Network Topology; Meshes—FIG. 2

FIG. 2 illustrates the network topology according to an embodiment of the present invention. The Global Grid 24 comprises a plurality of meshes 22. The Protocol classifies every node as either a router or a peer. If it is a router, it will not join a mesh. Instead, it will publish itself as a router, using the same protocol as peers 10 on the network, but running solely to aid in the establishment of new P2P connections. Routers usually have well-known addresses. The addresses of such routers may be hard-coded in a Global Grid application or stored on the client computer, but neither the presence nor the absence of such routers is a necessary element of the present invention; nor is the hard-coding or storage of the addresses of such routers in an application or on a computer a necessary element of the present invention.

If the node is a peer 10, then it will announce its service name to other nearby computers. The presence of this service name is distributed across the Global Grid 24, allowing other nodes to find the peer 10. If no such connectivity can be established, then an attempt is made to locate a router and connect to it, using the router to announce its presence. The program will connect to these peers 10 when findPeers( ) or an equivalent is called.

When a peer 10 attempts to bind to a mesh 22, it will try a sequence of methods of establishing connectivity to the closest peer, including, as needed, methods of traversing any network address translators or firewalls that may be present.

The Global Grid Protocol—The Process of Establishing a Network Connection—FIG. 3

FIG. 3 is a flow chart illustrating a method of establishing communication among peers and devices by dynamically generating identifiers and performing routing and traversal processes, according to an embodiment of the present invention. The method includes:

Step 110: create an XStream object. An XStream represents a unique instance of a connection through any type of medium. The data passed into the constructor of the XStream must be serializable so that it is capable of being sent to another peer or stored on the local device, and must contain a unique protocol identifier which specifies the protocol that will be used for establishing the connection so that the operating system may invoke the correct driver or service or hardware resource corresponding to that protocol. If the device or driver is not present on the computer or device that is running the program, then it will attempt to establish an indirect connection to the peer corresponding to the VSocket.

Media-specific information such as IP addresses, port numbers, MAC addresses, Ethernet port numbers or other types of routing information may be passed in the form of a VSocket to the constructor of this object. A "VSocket" is a serializable class or similar language construct containing information regarding a protocol-specific connection. A VSocket must be an abstract class in a language that supports abstract classes. A VSocket also contains methods for sending and receiving data over a network and contains a protocol identifier which must be registered with the Global Grid service prior to establishing a connection using the specific protocol.

Different embodiments of the protocol may support different types of routing methods. All the routing information needs to specify is a path to the closest Extensible Service Framework (XSF) compliant peer, which will allow the device to find other devices running the same service. An XSF is a plug-in framework similar to the Managed Extensibility Framework (MEF.) The XSF allows plug-ins and drivers to dynamically register themselves with the Global Grid service at run-time. Unlike MEF, XSF is a framework specifically for use with the Global Grid. It cannot be used as a general purpose application extensibility framework.

Step 120: the XStream determines whether the routing information supplied by the invoker is valid and in the correct format (such as checking for a valid IP address and port number, or verifying that a cable is plugged into the specified USB, COM or LPT port, and that the requested port actually exists.) If the information supplied is not valid or is not in the correct format, then an exception is thrown and the program quits 130. If an exception is thrown, this embodiment will identify the source of the error or what could possibly have gone wrong at the remote endpoint, if applicable; and if the exception is critical to the connection, the XStream will be reset, that is, all references to the XStream object will be invalidated. In other embodiments, an exception may be thrown and the program may quit without identifying the source of the error or what could possibly have gone wrong at the remote endpoint.

Step 140: If the information supplied is valid and in the correct format, then attempt to send a "handshake" signal to the remote device. The "handshake" contains a string or binary op code pertaining to "RXSFHandshake"+a randomly generated (either pure or pseudo) globally unique identifier (GUID) encoded either as a string or in raw byte format, appended to the end of the string or packet. The "handshake" request is sent in a single packet, datagram or flush, and is performed after an initial protocol-specific connection has been established using a VSocket, and there is enough routing information for the two peers to communicate. After the initial request is sent, the peer waits for a reply to the request. This may be done on a separate thread or within a thread pool. In this embodiment, the peer waits for a specified period of time, such as five seconds, but other periods of time may also be suitable. If a Reply containing another instance of the same form of request originally sent by the first peer is received, then the XStream is in CONNECTED state. If the handshake is not successfully completed, then the connection has failed.

Step 150: If a Reply containing another instance of the same form of request originally sent by the first peer is received, so that the XStream is in CONNECTED state, then server/routing processes are initiated. The routing mechanisms, such as configuring firewalls, opening "listening" sockets or configuring network hardware to respond to incoming connections are performed at this stage. This stage involves anything that is necessary in setting up routed connections to the peer. On an Ethernet network, it will usually involve:

(a) Listening for connections on an available port and protocol. (Usually this can be accomplished through a Sockets interface or equivalent.) The port and protocol can be determined through operating system methods or through a simple try-catch loop.

(b) Contacting an intermediary server to verify that it is possible to connect to the service.

The present embodiment employs an Ethernet extension, but the Protocol is not limited to Ethernet, due to the extensibility service framework component.

If an inbound connection is not possible, then proceed to Step 151.

Step 151: attempt to use the UPnP (Universal Plug and Play) method of NAT traversal to configure port forwarding on a router or other network device. To test if this method has been successful, attempt to send a packet through the specified routed port. If it is received, the traversal can be assumed to be successful. If it is not received, then traversal is assumed to be unsuccessful and the next method, port hole punching 152 is attempted.

Step 152: establish a connection to a well-known host and receive the return, from the remote host, of the outbound port number that the client used to connect to the remote host; then forward this number to other clients (also connected to the known host) to check if a connection on the outbound port is possible. If such a connection is established, that port number is assumed as the inbound port for connections to the client (on less restrictive NATs.) In this embodiment, the peer waits for a specified period of time, such as five seconds, but other periods of time may also be suitable.

If a connection is established through either UPnP (Universal Plug and Play) NAT traversal 151 or port hole punching 152, then the peer automatically becomes a "known router" and will be advertised throughout the Global Grid as a device with the capability to route network requests behind NAT/firewalls.

If a connection is not established through either UPnP (Universal Plug and Play) NAT traversal 151 or port hole punching 152, then proceed to step 153.

Step 153: attempt a route through a known host (router); specifically, attempt to connect to other nearby clients and have them establish connections on behalf of a globally unique identifier (GUID.) It is only possible to connect to clients who are known hosts, or "routers," including those that have become a "known router" as a result of the performance of the UPnP or port hole punching operations described in Steps 151 and 152. In this embodiment, the device will need to have enough bandwidth available to route the traffic; otherwise, an attempt will be made to establish a connection to another peer and attempts will continue to be made until permission is received to route traffic through the peer.

In each of these steps 151, 152 and 153, a check is performed to determine if a connection has been established before proceeding to the next step. If a connection cannot be established after all steps have been performed, then the process starts over until there is success or until the host program aborts the discovery process.

Step 160: asynchronously search for peers and raise an event when new peers are found. Once it is determined that the request is a CONNECT request, the embodiment asynchronously searches for peers and raises an event when new peers are found. Specifically, once it is determined that the request is a CONNECT request, the embodiment asynchronously searches for peers, and notifies the host application when a peer is found. A peer is found when either one with a matching mesh identifier connects, or a successful discovery packet is sent and a peer transmits back a response containing a matching mesh identifier.

A "mesh identifier" is the name for a listing of computers or devices. A host may have multiple mesh identifiers. A grouping of mesh identifiers is sent using a signed or unsigned integer indicating how many meshes are in its list, and then a list (in prefixed strings; the prefix may vary depending on specific embodiment) of mesh identifiers associated with that peer. Another embodiment could send mesh identifiers using floating point numbers instead.

In addition to this list, the PeerConnect signal is prefixed with the following (in order):

(a) A Globally Unique Identifier (GUID) used to uniquely identify the client (in this embodiment, it is sent as 16 raw bytes, but other embodiments could send it with more bytes, or as a string);

(b) A list of connected endpoints containing any protocol-specific information for establishing a connection. This embodiment uses UDP/IP over Ethernet, with the protocol-specific information for establishing a connection consisting of (i) a DNS name or IP address; (ii) the outbound port number that was used to establish a connection (serving as an alternative if the "listening" port is not working); (iii) the port number that the peer is listening on; and (iv) the port number that itself is listening on (as a server), but other kinds of information, either additional or alternative to these, are possible.

Steps 165 and 170: if a peer is found 165, that is to say, if a successful P2P connection to a peer running one or more of the same services (mesh identifiers) is successfully established, then raise an OnClientConnect event 170. The OnClientConnect contains the following information: An XStream used to communicate with the remote host; and a globally unique identifier (GUID) used to identify the connection. The XStream returned from the OnClientConnect can be used to communicate with the peer.

Steps 175 and 180: if a host receives an ADVERTISE signal 175, it attempts to validate the information received and add its mesh identifiers to the connected peers 180. That is to say, it retrieves the list of known mesh configurations from the remote host and adds them to the local list 180.

Steps 185 and 190: if a host receives a DISCOVER signal 185, it sends the list of active mesh identifiers and the clients associated with them to the remote host and then terminates the connection 190. In other embodiments, the receipt of a DISCOVER signal may not terminate the connection.

Operation

First Embodiment

The description of the first embodiment also explains, to some extent, how it operates. To that extent, the "Description" section of the Specification is incorporated herein by reference.

The computer program embodying the Global Grid Protocol is prepared and used in the same manner as other computer programs. Namely, one first expresses the Protocol as an algorithm in a format that can be read by the processor of the computer or other processing device on which it is installed; that is to say, it is coded as a series of expressions written in a computer programming language. To operate successfully, the Global Grid Protocol must be installed on each of the two (or more) peers between (or among) which a peer-to-peer connection is sought to be established.

Once it has been so installed, the Protocol is invoked when the user commands the computer or device to establish a network connection with a peer, that is, another computer or device.

Like some prior art, the Global Grid Protocol is a system and method of establishing connections between peers on a network. In contrast to prior art, however, the Global Grid Protocol seamlessly connects computers and devices to peers regardless of their physical location or subnet, and through firewalls and network address translators (NAT's) when they are present, using unique peer identifiers that are dynamically generated by each peer rather than being assigned by a network device or server, as in some prior art. The identifiers are constructed in such a way that IPv4-IPv6 inter-operability is not an issue. They are also constructed in such a way that inter-operability among Internet-connected computers and devices, on one hand, and non-Internet devices such as Bluetooth, IrDA (Infrared Data Association) devices, Wi-Fi/IP and other kinds of devices, on the other, is not an issue.

As more fully set forth in the "Description" section of the Specification, the invention works by creating "mesh identifiers." These allow computers and devices to communicate with each other by means of dynamically generated unique identifiers. Unlike the Peer Name Resolution Protocol (PNRP), the Global Grid Protocol operates to assign each computer or device in the mesh a unique identifier which is visible to every other computer in the mesh. Each identifier is randomly or pseudorandomly generated. The connection method is chosen dynamically by the Global Grid, and the configuration of any firewalls in the network environment. Provided two or more peers install the Global Grid Protocol on computers or devices with the capacity to connect to a network, a connection may be established even if they are located behind network address translators, firewalls or both; and connections may be established between devices that utilize a networking method other than an Internet connection, such as Bluetooth.

The computers and devices on which the Global Grid Protocol has been installed communicate as follows: First, a P2PCommChannel (or "Communication Manager," or any other name that is selected for this functionality) is created on a peer. The program determines which mode of connectivity the system is running in. It is either a ROUTER or a PEER. If it is a ROUTER, it will not join any mesh, and will publish itself as a router; using the same protocol as PEERS on the network, but running solely to aid in the establishment of new peer-to-peer connections. Routers usually have well-known addresses. The addresses of such routers may be hard-coded in a Global Grid application or stored on the client computer, although this is not essential to the operation of this embodiment. If the program is a PEER, it will announce its service name to other nearby computers. The presence of this service name will be distributed across the Global Grid, allowing other computers to find the peer. If no such connectivity can be established through various methods, an attempt will be made to locate a ROUTER and connect to it, using the router to announce its presence. The program will connect to these peers when findPeers( ) or an equivalent is called. It should be noted that a peer may run as both a peer and a router at the same time.

When a peer attempts to bind to a mesh, it will try a sequence of methods of establishing connectivity to the closest peer, first initiating routing processes, and then, if a connection cannot be established, attempting a sequence of methods of traversing any network address translators or firewalls that may be present.

The first traversal method the embodiment will attempt is to use existing Universal Plug and Play (UPNP) technology to securely re-configure the router to enable direct connectivity to other clients. If the router does not support this technology, then port hole punching will be attempted.

The embodiment attempts to establish a connection to a well-known host and pass session information to clients, allowing them to establish a connection. Depending on the configuration of the NAT or firewall, it may be possible to establish an outbound connection to a well-known host and pass the session information to other peers, allowing them to establish a connection with the mesh.

If neither of these methods works, routers (including hosts that publish themselves as routers incident to the UPnP and port hole punching processes) will be used to pass information between clients. If the router becomes too busy, a different router will be used.

Alternative Embodiments

Description and Operation

The Global Grid Protocol can be implemented by using a programming language other than C# to express the Global Grid Protocol as an algorithm readable by two or more computers or devices with network connection capabilities. One alternative embodiment would employ the programming language C; another alternative embodiment would employ the programming language C++; another alternative embodiment would employ Java, or any other programming language. In each case, the system or method described by the Global Grid Protocol would be the same and would operate in basically the same way.

Other alternative embodiments would use a framework other than .net, Mono or an implementation of C# and the Base Class libraries.

Other alternative embodiments would use a processor other than the one that was used in the First Embodiment.

Other embodiments would consist of implementing the Global Grid Protocol on any device with network connection capability that is not identified in the First Embodiment or any of the mentioned alternative embodiments.

Other alternative embodiments would consist of a combination of two or more of the alternative embodiments mentioned herein.

CONCLUSION, RAMIFICATIONS AND SCOPE

Thus it can be seen that at least one embodiment of the Global Grid Protocol provides a simpler and easier way for computers and users to network with others; eliminates the need for IP addresses; provides a solution to IPv4-IPv6 inter-operability problems; provides solutions to IP-nonIP device inter-operability problems; increases connection speed during periods of heavy network traffic; and increases security as a result of the use of dynamically generated, globally unique identifiers instead of static addresses. The Protocol uses existing libraries to construct identifiers and if one is not present it will construct its own globally unique identifier.

Although other NAT traversal methods have been devised, the Global Grid Protocol improves the efficiency of peer-to-peer networking systems by establishing a system for dynamically configuring specified methods in conjunction with a method for locating peers by the use of dynamically-generated globally-unique mesh identifiers that are not vulnerable to IPv4-IPv6 inter-operability problems in the presence of NAT's. Moreover, the Global Grid Protocol overcomes the inability of virtual private networks to traverse firewalls without requiring, for example, the compilation of a global list of firewalls. Nor does it require a central repository of identifiers, as Skype and some other peer-to-peer networking systems do.

Moreover, unlike some other peer-to-peer networking protocols, the Global Grid Protocol has the further advantage of being extensible. For example, while some peer-to-peer networking systems like Skype enable chat or VoiceOverIP, they do not necessarily enable file-sharing or application-sharing. Meanwhile, other peer-to-peer networking systems, like BitTorrent, enable file-sharing or application-sharing, but not chat or VoiceOverIP. The Global Grid Protocol can be deployed to enable chat, Voice Over IP, file-sharing, application sharing, or any other networking applications.

Additionally, unlike other peer-to-peer networking methods and systems that require connections to the Internet, the functionality of the Global Grid Protocol extends both to computers and devices with Internet connectivity, on one hand, and to devices with network connectivity other than the Internet, such as Bluetooth devices.

While the above description contains many specificities, these should not be construed as limitations on the scope, but rather as an exemplification of one embodiment and several possible alternative embodiments thereof. In addition to the Alternative Embodiments described above, many other variations in the manner or purpose for which the Protocol is used are possible. For example, the XStream described in the First Embodiment contains information like IP addresses, port numbers, MAC addresses and Ethernet port numbers. The content of the XStream, however, can be varied to support different types of routing methods. The described embodiment contemplates using UDP/IP over Ethernet, with the protocol-specific information for establishing a connection consisting of (i) a DNS name or IP address; (ii) the outbound port number that was used to establish a connection (serving as an alternative if the "listening" port" is not working; (iii) the port number that the peer is listening on; and (iv) the port number that itself is listening on (as a server.) These specific kinds of information are not essential to the Protocol. Other kinds of information, either additional or alternative to these, are possible.

Error-checking is a useful feature, but variants of the Protocol may employ different kinds or methods of error-checking. For example, the first described embodiment includes an error-checking process in which the embodiment identifies the source of the error when an exception is thrown and, if the exception is critical to the connection, all references to the XStream object are invalidated. In other variants, an exception may be thrown and the program may quit without identifying the source of the error. Still other variants may not include an error-checking feature at all.

In the described embodiment, a period of five seconds is specified as the length of time a peer will wait for a reply after a "handshake" request is sent 140. The Protocol could be modified to vary the length of time a peer waits for a reply after a "handshake" request is sent—for example, 1 second, 2 seconds, 10 seconds, or literally any other measurable interval of time could be specified.

Implementations of the Protocol also may vary the length of time a peer a waits after an outbound port number is forwarded to other clients to check if a connection on the outbound port is possible 152. The described embodiment specifies a period of time such as five seconds. Variants of the Protocol may specify a different length of time—for example, 1 second, 2 seconds, 10 seconds, or literally any other measurable interval of time—before the next method, attempting a route through a known host 153, is attempted.

The stage of the Protocol at which server/routing processes are initiated 150 involves anything that is necessary in setting up routed connections to a peer in the kind of network that is being used. The server/routing processes that are initiated may be varied depending on the kind of network involved. Ethernet is the most commonly used network, but the Protocol can work with other kinds of networks and networking systems, such as Local Talk, Token Ring, Fiber Distributed Data Interface (FDDI), Asynchronous Transfer Mode (ATM), and so on.

The composition of prefixes in mesh identifiers may vary in different implementations of the Protocol. Additionally the kinds of protocol-specific information to be prefixed to the PeerConnect signal may be modified. For example, the First Embodiment described herein contemplates the use of UDP/IP over Ethernet, with the protocol-specific information for a connection consisting of (1) a DNS name or IP address; (2) the outbound port number that was used to establish a connection (serving as an alternative if the "listening" port" is not working; (3) the port number that the peer is listening on; and (4) the port number that itself is listening on (as a server), but other kinds of information, either additional or alternative to these, are possible.

As can be seen, many different embodiments of the Protocol and many variations in the manner or purpose for which the Protocol is used are possible. Accordingly, the scope should be determined not by the embodiments described, but by the appended claims and their legal equivalents.

The invention claimed is:

1. A method of enabling communication among a plurality of computers and devices the hardware of which is configured in such a way that they are able to communicate to other computers and devices through a network connection, comprising:

dynamically generating identifiers; and performing routing and traversal methods, whereby a network connection may be established whether network address translators, firewalls, or any combination thereof, are present or not, using the following steps:

(a) creating an xstream object containing routing information and identifiers, by passing serializable data containing a unique protocol identifier specifying the protocol that will be used for establishing a connection into the constructor of said xstream, wherein said xstream is constructed in such a way that an attempt will be made to establish an indirect connection to the peer corresponding to a vsocket if the device or driver corresponding to the protocol identified by said protocol identifier is not present on the computer or device, said vsocket comprising a serializable class or language construct containing information regarding a protocol-specific connection, methods for sending and receiving data over a network, and a protocol identifier;

(b) generating a globally unique identifier;

(c) broadcasting said globally unique identifier;

(d) initiating routing processes;

(e) performing network address translator traversal, firewall traversal and other processes on an as-needed basis if an inbound connection cannot be established;

(f) asynchronously searching for peers using the xstream and said globally unique identifiers; and (g) establishing a connection to a peer when either a peer with a matching mesh identifier connects, or a discovery request or packet is sent and a peer transmits a response containing a matching mesh identifier.

* * * * *